United States Patent [19]

LLauge

[11] 4,318,650

[45] Mar. 9, 1982

[54] PLUG-RIVET FOR SECURING PANELS OR THE LIKE

[75] Inventor: Joaquin R. LLauge, Barcelona, Spain

[73] Assignee: ITW Espana S.A., Barcelona, Spain

[21] Appl. No.: 171,213

[22] Filed: Jul. 22, 1980

[30] Foreign Application Priority Data

Jul. 23, 1979 [ES] Spain ................. 244.708[U]

[51] Int. Cl.³ ............................................. F16B 13/04
[52] U.S. Cl. ............................................ 411/38; 411/43
[58] Field of Search .................. 411/38, 37, 35, 34, 411/43, 340, 344; 24/211 P, 212, 73 P, 73 PF

[56] References Cited
U.S. PATENT DOCUMENTS 4,089,248  5/1978  Anscher ................. 411/38
4,222,304  9/1980  Yoshida ................. 411/34

*Primary Examiner*—Ramon S. Britts
*Attorney, Agent, or Firm*—J. R. Halvorsen; T. W. Buckman

[57] ABSTRACT

A one-piece plastic plug-rivet having an open frame body which is laterally expandable and having a cylindrical appendix disposed within the body and being formed with a pull shank for producing the expansion. The cylindrical appendix is provided with projection means which cooperate with a stepped aperture in the head of the plug-rivet for maintaining the body in the expanded condition.

3 Claims, 3 Drawing Figures

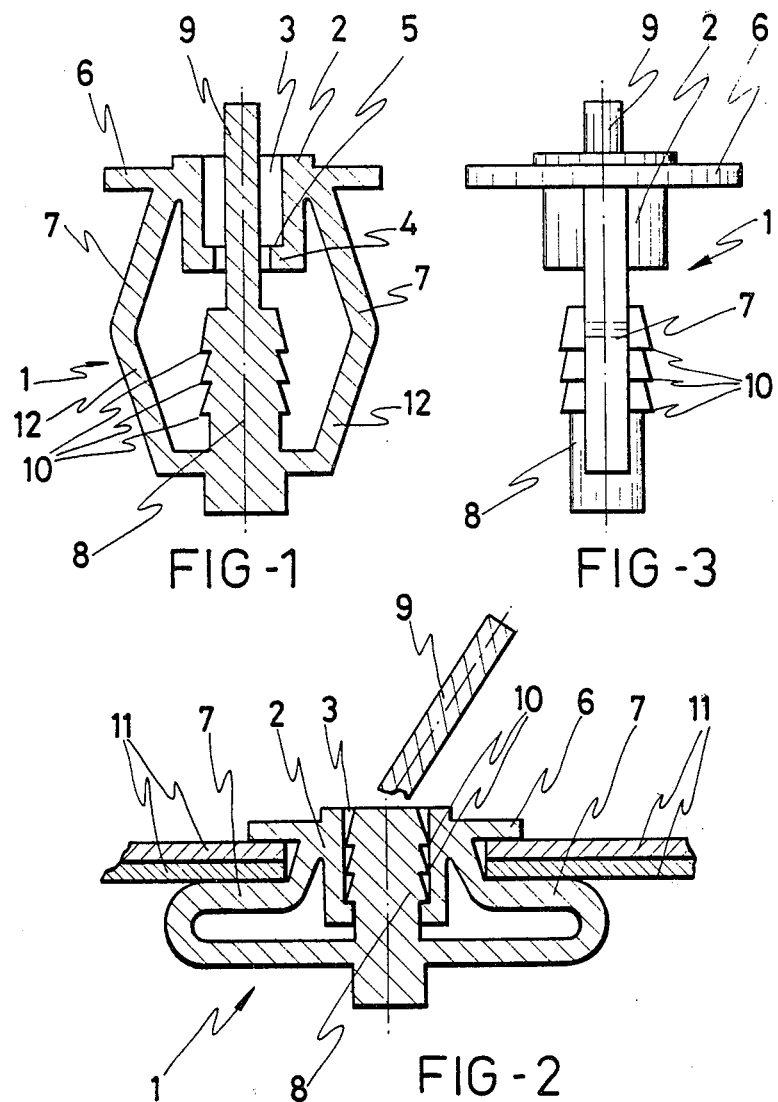

PLUG-RIVET FOR SECURING PANELS OR THE LIKE

The present invention refers to an improved plug-rivet for securing panels or the like.

The know plug-rivets comprise a flexible molded body forming an enlarged hexagonal frame; a cylindrical head provided with a through-bore having a large diameter is disposed at one of the smaller sides of said frame while a cylindrical appendix, the diameter of which is smaller than the head and which faces the mentioned head, is disposed at the opposite smaller side thereof.

Panels or sheets should necessarily be secured by means of these known plug-rivets with the help of an auxiliary member consisting of a screw passing through the bore of the head, which screw is threaded in the mentioned cylindrical appendix. Thus, said cylindrical appendix is pulled towards the cylindrical head, being housed in the through-bore of the head, and the lateral sides of the hexagonal frame are flexed, whereby the panels to be secured are retained between the outer surface of said lateral sides and an outer annular fin of the head. The cylindrical appendix is retained in the bore of the head since the lower base thereof has an inner step on which the teeth, provided in the outer surface of the cylindrical appendix and which resist pulling thereof, rest.

These known plug-rivets, although practical, have the disadvantage that the mentioned auxiliary member or screw which is threaded to the cylindrical appendix, is necessary for the functioning thereof, so that by said screw the cylindrical appendix can be pulled and, therefore, the panels can be secured.

Taking into account the aforegoing, the plug-rivet of the invention does not incorporate the mentioned screw used to pull the cylindrical appendix, and it comprises a flexible, molded single-piece body lacking the mentioned screw.

Thus, the plug-rivet of the present invention is characterised in that the lower base of the cylindrical appendix extends into a shank, the diameter of which is smaller than the cylindrical appendix but longer, passing through the bore of the head. Thus, the panels are secured in a manner similar to that of the mentioned plug-rivets. However, in this case no screw is required, since by merely pulling the shank, using a suitable tool, the cylindrical appendix is housed in the corresponding cylindrical head and consequently the lateral sides of the mentioned frame are flexed, and the panels are secured in a manner similar to that of the already mentioned plugs, i.e. between the inner surface of the fin corresponding to the head and the outer surface of the sides thereof.

Once the cylindrical appendix, provided with the teeth, is housed in the cylindrical head and same is retained in the step of said head, the shank which protrudes from the outer surface of said head is cut, and the rivet does not protrude at all.

To complement the description which will now be made and for a better understanding of the characteristics of the invention, a sheet of drawings is attached to this specification, the figures whereof represent the following:

FIG. 1 illustrates a longitudinal sectional view of the plug-rivet made in accordance with the invention.

FIG. 2 illustrates a sectional view of the plug-rivet securing two panels to one another, showing how the excess portion of the shank of the cylindrical appendix, housed in the head of the rivet, is cut.

FIG. 3 illustrates a side elevational view of the plug-rivet.

Referring to the drawings, it can be seen that the plug-rivet comprises a flexible, one-piece molded body 1 which forms a type of enlarged hexagonal frame, at one of the smaller sides of which is disposed a cylindrical head 2 directed towards the geometric centre of the mentioned hexagonal frame, which head is provided with an axial bore 3 having a large diameter, the lower part of which is thinned since the lower wall or edge corresponding to the base of said cylindrical head 2 extends into a short annular inner fin 4 forming a step 5.

Likewise, the side at which the mentioned head 2 is disposed extends into an outer fin 6 which forms a sharp angle with the upper lateral sides 7 of the mentioned hexagonal frame.

On the other hand, and at the opposite smaller side is disposed a cylindrical appendix 8, the diameter of which is smaller than that of the head 2, which cylindrical appendix 8 faces said head, the inner base of which extends into a shank 9, the diameter of which is smaller than that of the cylindrical appendix, passing through the bore 3 of the head 2 and protruding outwards therefrom. The cylindrical appendix 8 has teeth 10 corresponding to the outer side surface thereof and formed by slightly truncated lugs of said surface.

Two panels are secured to one another using the plug-rivet made in accordance with the invention as follows:

Said plug-rivet is introduced in a hole made in the panels 11 to be joined, so that the mentioned plug-rivet is introduced until the lower surface of the fin 6 butts against the surface corresponding to the upper panel 11.

Thus, by pulling the shank 9 upwards, using a suitable tool, the cylindrical appendix 8 will be housed in the bore 3 corresponding to the head 2, while the lateral sides 7 and 12 of the hexagonal frame will flex as said cylindrical appendix 8 is pulled, consequently being housed in the bore 3 of the cylindrical head 2. Depending on the thickness of the panels 11 to be joined, the moment will be reached when the mentioned cylindrical appendix 8 can no longer be pulled and, consequently, the sides 7 and 12 will no longer flex, reaching a butt since the panels 11 joined to one another do not allow the lateral sides 7 to be brought closer to the corresponding fin 6, said panels 11 being retained in the space between the said two parts, i.e. the fin 6 and the lateral upper sides 7.

The cylindrical appendix 8 in turn would have been retained in the bore 3 of the head 2 by means of the teeth 10 which will be retained in the step 5 disposed at the lower part of the bore 3 of the mentioned head 2, whereby the excess portion of the shank 9 which protrudes from above said head 2 will be cut, the rivet being situated at the level of the fin 6.

The described plug-rivet does not require any auxiliary element to secure the panels 11, since with a mere suitable tool, which can retain the shank 9 to pull same and consequently house the cylindrical appendix 8 in the bore 3 of the head 2, said panels 11 are secured.

I claim:

1. Improved plug-rivet for securing panels of the like of the type comprised of a flexible one-piece molded plastic body forming a type of enlarged flexible hexagonal frame, at one of the sides whereof is disposed a cylindrical cup-shaped head provided with a pre-determined diameter large bore and an inner smaller diameter diameter aperture opening through the base thereof, said head having a laterally extending flange forming a sharp angle with the upper lateral sides of the frame; at the opposite lower side of said frame is disposed a cylindrical appendix having a portion of pre-determined diameter smaller than that of the aperture in the base of said head and a second larger portion having a plurality of frusto-conical segments provided with annular teeth to be fixed or retained in the lower aperture of the mentioned cylindrical head, essentially characterized in that said cylindrical appendix includes a shank having a small diameter which passes through the aperture and bore corresponding to the head and protruding therefrom, said head being substantially continuous and spaced laterally from said frame and capable of lateral expansion when said shank constituting the gripping point for the tool used to pull same causes the cylindrical appendix to be housed in the head in a tight fit condition.

2. An improved plug-rivet of the type claimed in claim 1 wherein said cylindrical appendix and cup-shaped head have diameters which are greater than the lateral width of the hexagonal frame.

3. An improved plug-rivet of the type claimed in claim 2 wherein said cylindrical appendix has a portion thereof extending below said frame away from said head and a portion extending inwardly within said frame and carrying said frusto-conical segments which project coaxially from the lower side of said frame toward said head, said shank extending from the free end of said frusto-conical segments coaxially within and spaced from the smaller diameter aperture and the pre-determined large diameter bore as well as protruding from the open end of said cup-shaped head.

* * * * *